United States Patent
Farquhar

(10) Patent No.: US 9,177,160 B1
(45) Date of Patent: Nov. 3, 2015

(54) KEY MANAGEMENT IN FULL DISK AND FILE-LEVEL ENCRYPTION

(71) Applicant: EMC Corporation, Hopkinton, MA (US)

(72) Inventor: Ian B. Farquhar, Glenwood (AU)

(73) Assignee: EMC Corporation, Hopkinton, MA (US)

( * ) Notice: Subject to any disclaimer, the term of this patent is extended or adjusted under 35 U.S.C. 154(b) by 77 days.

(21) Appl. No.: 14/039,242

(22) Filed: Sep. 27, 2013

(51) Int. Cl.
*G06F 12/14* (2006.01)
*G06F 21/60* (2013.01)

(52) U.S. Cl.
CPC .......... *G06F 21/602* (2013.01); *G06F 12/1408* (2013.01)

(58) Field of Classification Search
CPC .............................. G06F 12/1408; G06F 21/602
USPC ........................................... 713/193, 156, 158
See application file for complete search history.

(56) References Cited

U.S. PATENT DOCUMENTS

| | | | |
|---|---|---|---|
| 2009/0122986 A1* | 5/2009 | Tahan et al. | 380/270 |
| 2010/0268942 A1* | 10/2010 | Hernandez-Ardieta et al. | 713/156 |
| 2010/0287083 A1* | 11/2010 | Blythe | 705/35 |
| 2011/0185113 A1* | 7/2011 | Goss et al. | 711/103 |
| 2013/0086380 A1* | 4/2013 | Krishnaswamy et al. | 713/168 |
| 2014/0325643 A1* | 10/2014 | Bart et al. | 726/22 |

OTHER PUBLICATIONS

ELCOMSOFT, Forensic Disk Decryptor Product, Dec. 20, 2012.
Zhang et al. Cross-VM Side Channels and Their Use to Extract Private Keys, ACM, CCS'12, Oct. 16-18, 2012, Raleigh, North Carolina, USA.
Huang, Hacking the XBOX, 2003, http://hackingthexbox.com.
Anderson, Ars Technica, Feb. 21, 2011, http://arstechnica.com/tech-policy/2011/02/black-ops-hbgary-wrote-backdoors-and-rootkits-for-the-government/.
Shamir et al. Playing Hide and Seek with Stored Keys, Sep. 22, 1998, http://www.cs.jhu.edu/~astubble/600.412/s-c-papers/keys2.pdf.

* cited by examiner

*Primary Examiner* — Haresh N Patel
(74) *Attorney, Agent, or Firm* — Ryan, Mason & Lewis, LLP

(57) ABSTRACT

Methods, apparatus and articles of manufacture for key management in full disk and file-level encryption are provided herein. A method includes fetching a distinct cryptographic key from a secure module in connection with a request to perform one of a decryption operation and an encryption operation on at least one of an individual file and an individual sector within a storage device on a computing device; using the distinct cryptographic key to perform the one of a decryption operation and an encryption operation on the at least one of an individual file and an individual sector within the storage device on the computing device; and discarding the distinct cryptographic key subsequent to said performing the one of a decryption operation and an encryption operation on at least one of an individual file and an individual sector within the storage device on the computing device.

20 Claims, 2 Drawing Sheets

KEY MANAGEMENT IN FULL DISK AND FILE-LEVEL ENCRYPTION

FIELD

The field relates generally to cryptography, and more particularly to key management.

BACKGROUND

The use of data encryption to prevent unauthorized disclosure of data stored on a storage medium is a widely used control, applicable, for example, from mobile devices through to the Internet of Things and high-end servers. Two standard data encryption approaches include full disk encryption (FDE) and file-level encryption (FLE). Full-disk encryption encrypts an entire disk (or partition, or logical unit number (LUN)) using a single key. Variants exist which provide key splitting and/or certificate-based access, although such variants nonetheless result in the production of a single key which decrypts the on-disk content.

FLE includes encrypting individual files on a disk. Each file may have its own key, or each entity (for example, a specific user) may have its own key, and some parts of a disk may even remain unencrypted (a concept also referred to as "folder encryption"). Key derivation is typically used so that key reuse across multiple files does not present the possibility of cryptanalytic attacks, and each file has its own unique key. FLE allows for protection of data from entities (users, processes, etc.) even on the same system, for which FDE does not protect.

FDE typically protects against inappropriate access to a given storage device. However, users and processes on a validly authorized system must rely on the operating system's (OS's) own controls, as entities on the system see the disk as plaintext. On the other hand, FDE can be carried out in hardware and/or device drivers. Both FDE and FLE require a reliable root of trust, thereby ensuring that the code associated with the cryptographic functionality has not been compromised.

In contrast to FDE, an FLE's threat model typically includes entities on the same system, potentially including even users with administrative access to the system. Protection against administrative users is difficult, however, because those administrative users may be able to access keys in memory. FLE can facilitate more complex access controls than FDE, even extending the base controls in the underlying OS. However, the implementation of FLE typically requires OS changes at the file (or filesystem) level, either implementing an entirely new encrypted file or fitting into an existing file. As such, the need to integrate the existing OS's identity management system to the key access control system can add significant complexity.

Key management presents challenges with both FDE and FLE. Keys are exposed to risk vectors that include storage and use. Accordingly, attempts are made to store keys securely, protected from all but authorized access. However, existing FDE and FLE approaches face challenges in protecting access to keys during use. For example, a key used in FDE and a key used in FLE are loaded into the given system's memory. There, the key is protected only by the OS's isolation techniques, where a malicious system process or administrator could access the keys. Research has shown that in-memory keys are easy to identify because such keys have very high entropy compared to other non-key memory contents. Ideally, keys should be resident in memory for as short a time as possible to minimize the possibility of attack.

Potential problems and vulnerabilities exist with such approaches. For example, such an approach can create vulnerability to a cold-boot attack, wherein the running memory of the system is accessed. Additional vulnerability can include potential key leakage via side-channel attacks (with respect to other processes on the system and/or other virtual machines (VMs) co-resident on a hypervisor). Further, another potential vulnerability exists via access to the key from malicious processes with administrative privileges (such as a rogue administrator, for example).

Accordingly, once access to the key to a disk, partition, and/or LUN is attained, full access to the data contained therein is possible. As such, a need exists for improved key management in connection with FDE and FLE.

SUMMARY

One or more illustrative embodiments of the present invention provide techniques for key management in full disk and file-level encryption.

In accordance with an aspect of the invention, a method is provided comprising the steps of: fetching a distinct cryptographic key from a secure module in connection with a request to perform one of a decryption operation and an encryption operation on at least one of an individual file and an individual sector within a storage device on a computing device; using the distinct cryptographic key to perform the one of a decryption operation and an encryption operation on the at least one of an individual file and an individual sector within the storage device on the computing device; and discarding the distinct cryptographic key subsequent to said performing the one of a decryption operation and an encryption operation on at least one of an individual file and an individual sector within the storage device on the computing device.

In accordance with another aspect of the invention, a method is provided comprising the steps of: fetching a distinct cryptographic key from a secure module in connection with a request to decrypt at least one encrypted section of multiple files within a storage device on a computing device; using the distinct cryptographic key to decrypt the at least one encrypted section of multiple files within the storage device on the computing device; and discarding the distinct cryptographic key subsequent to said decryption of the at least one encrypted section of multiple files within the storage device on the computing device.

The key management techniques of the illustrative embodiments overcome one or more of the problems associated with the conventional techniques described previously. These and other features and advantages of the present invention will become more readily apparent from the accompanying drawings and the following detailed description.

DETAILED DESCRIPTION

Figure 1:
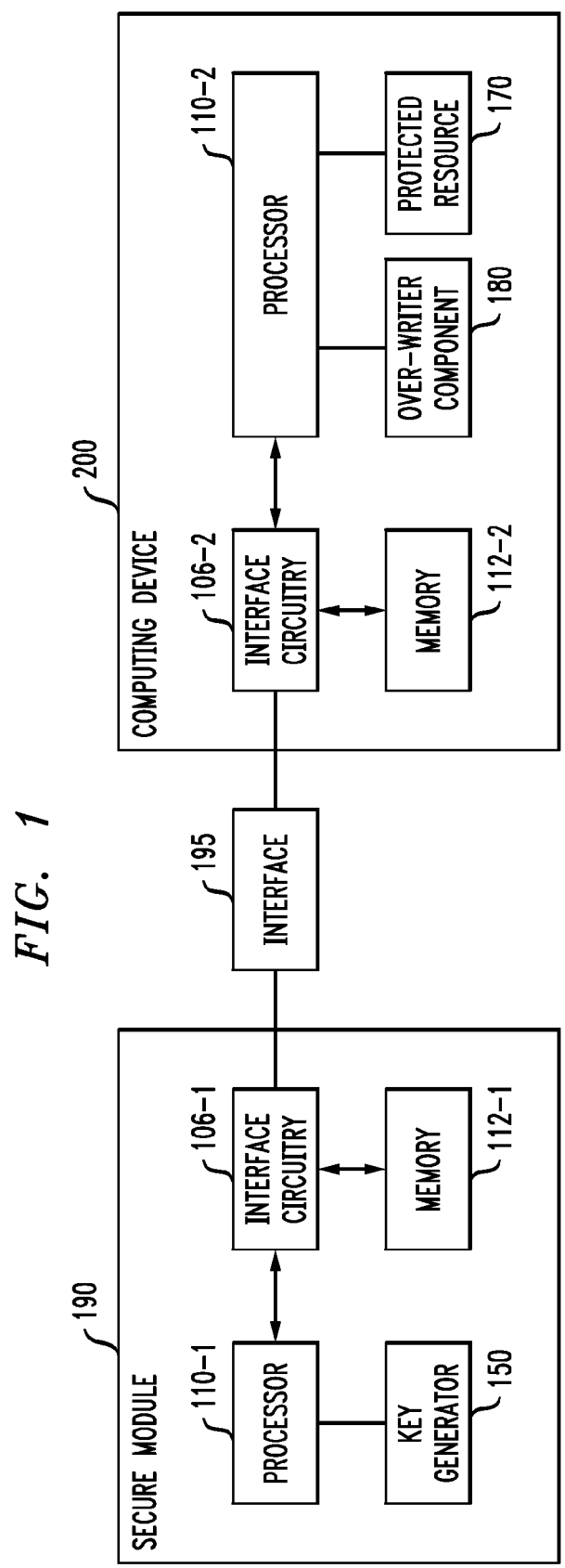
FIG. 1 is a diagram illustrating an example embodiment of the invention.

As will be described, the present invention, in one or more illustrative embodiments, provides techniques for key management in full disk and file-level encryption. Illustrative embodiments of the present invention will be described herein with reference to exemplary communication systems and associated processing devices. It is to be appreciated, however, that the invention is not restricted to use with the particular illustrative system and device configurations shown.

Accordingly, the term computing device, as used herein, is intended to be construed broadly so as encompass any type of processing device that incorporates cryptographic functionality (such as a computer, server, mobile telephone, radio-frequency identification (RFID) tag or reader, an Internet of Things intelligent device, authentication token, etc.). Similarly, the term authentication server should be understood to encompass any type of processing device or set of such devices that is operative to authenticate a passcode provided by an authentication token or other type of device. As used herein, an authentication server need not be a network-based server, and may be implemented as a portion of a device that performs other functions, as a combination of multiple servers or other devices, or in other forms.

Additionally, the term cryptographic information, as used herein, is intended to include keys, passwords, crypto-variables, passcodes, answers to life questions, or other authentication credentials, or values derived from such authentication credentials, or more generally any other information that a user may be required to submit in order to obtain access to an access-controlled application or any other information that may be utilized for cryptographic authentication purposes.

A computing device may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a computing device, a person utilizing or otherwise associated with the device, or a combination of both the person and the device.

Further, as detailed herein, a protected resource may be, for example, an access-controlled application, web site or hardware device. In other words, a protected resource is a resource that grants user access responsive to an authentication process, as will be described in greater detail below. The protected resource may be, for example, a remote application server such as a web site or other software program or hardware device that is accessed by a computing device over a network. The network can include, for example, a global computer network such as the Internet, a wide area network (WAN), a local area network (LAN), a satellite network, a telephone or cable network, or various portions or combinations of these and other types of networks.

As illustrated in FIG. 1 and described additionally below, an aspect of the invention includes the implementation of a secure module or processor (for example, a universal serial bus (USB) key, a hardware security module (HSM) peripheral component interconnect (PCI) card or module on the motherboard that is connected to a personal computer, etc.), as well as the implementation of a separate device connected to the secure module. Additionally, in at least one embodiment of the invention, the secure module is tamper respondent (that is, implemented within a tamper-respondent cryptographic boundary), whereas the separate device to which the secure module is connected can include a general computing device.

Accordingly, FIG. 1 shows an exemplary authentication system corresponding generally to an implementation of a system which comprises a secure module 190 (for example, a USB device, a PCI card, a smartcard, an RFID, an HSM, etc., such as described above) and a computing device 200 that can attempt access a protected resource on the basis of an authenticated user request (for example, a personal computer (PC), a telephone, a tablet, a server, a laptop, a set-top box, an embedded device, etc.).

As such, at least one embodiment of the invention includes utilizing and/or incorporating the secure module 190 connected attached to the computing device 200 via a high-performance interface 195. Examples of high-performance interfaces can include but are not limited to universal serial bus 3.0 (USB3) interfaces as well as other removable media card interfaces, storage busses, internal busses, and/or custom internal bussing within the controller board on a disk drive. Moreover, such high-performance interfaces utilized in connection with one or more embodiments of the invention preferably encompass a reasonable level of confidentiality and low-latency.

As such, in contrast to disadvantageous existing approaches (as detailed above), rather than having a single key for an entire disk, partition and/or LUN, at least one FDE-related embodiment of the invention includes providing a context via the secure module 190 whereby every sector, cluster, and/or extent is associated with an individual key.

Also, in at least one FLE-related embodiment of the invention, each single file is associated with an individual key, but the key hierarchy which ultimately generates that file-key is never placed into the memory of a system. Rather, the key hierarchy remains securely stored within the secure module 190. As depicted in FIG. 1, keys are created, stored and managed within the cryptographic boundary of the secure module 190. Additionally, as described herein, each such key protects individual sectors or files. Moreover, such a key can transform an individual sector into plaintext in the host's main memory. Consequently, for the purposes of confidentiality, the key and plaintext are equivalent in sensitivity. If the plaintext can be decrypted into the main memory, the "leaf key" (that is, a key which gives access to a file or sector and nothing else) can also reside in the main memory. Security equivalence of the key and the plaintext is an important aspect of the techniques described herein.

Accordingly, in such an embodiment, there is no need to perform bulk cryptography in the secure module, as, in such an embodiment, the secure module it is purely a key server, authentication oracle and authorization manager for the disk data. A user can authenticate him or herself via some mechanism to the secure module, and the secure module presents to the user the keys needed to access only the bits of the disk that the secure module determines that the user should be able to access.

In the example embodiment depicted in FIG. 1, the secure module 190 and 200 communicate with one another via an electric connection to interface 195 using interface circuitry 106-1 and 106-2, respectively. It should also be appreciated, nonetheless, that in one or more additional embodiments, the devices 190 and 200 can communicate with one another over a wireless channel using respective antennas and respective interface circuitry (given appropriate cryptographic protection of the in-transit data over the wireless interface). Each of the devices further comprises a processor 110 coupled to a memory 112.

In accordance with at least one embodiment of the invention, when an encrypted file within a storage device (in an FLE context) or an encrypted section, cluster and/or extent of a storage device (in an FDE context) is sought for access within or in connection with the computing device 200, a key is required for decryption purposes. As depicted in FIG. 1, a key is fetched from the secure module 190 via communication through interface 195. The act of fetching and subsequent use of the key, in at least one embodiment of the invention, can be carried out by modified files (in an FLE context) or block-drivers (in an FDE context) on computing device 200's operating system or hypervisor. This may trigger an authentication process before completion, such as, for example, requiring a human user to biometrically authenticate to the secure module 190. The key, subsequently, is utilized promptly by the computing device 200 to decrypt the data in the given portion(s) of the storage device, which in FIG. 1 is depicted as protected resource 170. Promptly after this use, the key is securely discarded (for example, overwritten) via over-writer component 180. In an FDE context, the key would be in memory just long enough to decrypt the sector, and would then be over-written. In an FLE context, the key can be cached for as long as the given file was open, or maintained only as long as the file is being read, wherein a timeout is subsequently instituted which destroys the key after a few seconds of file inactivity. It can be requested again if a subsequent read request arrives.

Note that the operation of writing is handled appropriately. In an FDE context, to write the sector, cluster or extent, the driver will request a key for that logical address on the disk, the data will be encrypted, and the ciphertext written to disk. In an FLE context, a file creation request will see the file's name provided to the secure device, and the device will provide an appropriate key for the file.

Accordingly, the secure module 190 can store a secret value in the form of a key. For example, the key may be a particular key from a set of keys generated by a key generator component 150 resident on the secure module 190. Additionally, as further detailed herein in connection with at least one embodiment of the invention, the key generated by key generator 150 and stored in the secure module 190 is used to access a protected resource 170 in the computing device 200.

It is to be appreciated that a given embodiment of the disclosed system may include multiple instances of secure module 190, computing device 200 and/or key generator 150, and possibly other system components, although only single instances of such components are shown in the simplified system diagram of FIG. 1 for clarity of illustration.

While the key generator 150 depicted in FIG. 1 is illustrated as resident on the secure module 190, it should be appreciated that in one or more embodiments of the invention, the key generator 150 can be implemented as separate from and electrically connected to the secure module 190 such that the secure module 190 can read a given key (or another authentication value) directly from the key generator 150. The key generator 150 may, for example, include a server or other type of module that is accessible over a network, or it may include a software component resident on the secure module 190. As another alternative, key generator 150 may be distributed over multiple devices, one of which may be the secure module 190.

Device elements such as interface circuitry 106, processor 110, memory 112 and one or more of the other functional modules of devices 190 and 200 may be implemented in whole or in part in the form of one or more integrated circuits. By way of example, the interface circuitry 106 may comprise conventional transceivers of a type well known in the art, and the processor 110 may comprise a microprocessor, a microcontroller, an application-specific integrated circuit (ASIC), a field programmable gate array (FPGA) or other type of processing circuitry, as well as portions or combinations of such circuitry elements.

Additionally, although not illustrated in the example depicted in FIG. 1, in one or more embodiments of the invention, the secure module 190 can include a cryptographic accelerator, a random number generator, and tamper detection and response circuitry.

The memory 112 may be viewed as an example of what is more generally referred to herein as a "computer program product" or an "article of manufacture" having executable computer program code embodied therein. Such a memory may comprise electronic memory such as random access memory (RAM), read-only memory (ROM) or other types of memory, in any combination. The computer program code embodied in the memory 112 when executed by the processor 110 causes the corresponding device to perform functions associated with the techniques detailed herein. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within the authentication system.

Other device elements may be implemented at least in part in the form of software stored in the corresponding memory 112 and executed by the corresponding processor 110. One or more of these elements alternatively may be implemented using a combination of hardware, software and firmware.

In accordance with at least one embodiment of the invention (such as the example embodiment depicted in FIG. 1), a key such as generated by and fetched from a secure module (190) protects an individual data item on a computing device (200). As detailed above, for example, the plaintext for the file/sector ends up in the memory (112-2) of computing device 200. Also, the key and the plaintext are considered security equivalents. Alternatively, at least one embodiment of the invention can include carrying out each of the relevant cryptographic operations entirely within the secure device 190, wherein the key never ends up in the main memory.

Additionally, the short lifetime of this key in the memory (112-2) of the computing device 200 renders side-channel attacks and direct memory access (DMA) extremely difficult to mount. Also, the noise introduced by unrelated keys (for example, hundreds of unrelated keys) per second into the memory 112-2 further renders statistical attacks (especially timing and power-based attacks) very difficult to mount.

One or more embodiments of the invention can additionally include employing one or more counter-measures from within the secure module 190 to hinder and/or preclude an attack from a malicious administrator or process attempting to attack the key consuming process. Examples of such counter-measures can include running binary integrity checks (from a DMA-capable interface between secure device and PC, for example, Firewire or PCI) against the memory space of the consuming application and associated OS modules, running analytics on the access patterns of files and/or sectors, clusters and/or extents of the storage device to detect anomalies, hosting the code for the consuming module on the secure device 190 and periodically recompiling and rearranging the code space to frustrate potential attacks, etc. More generally, the secure module 190 can monitor the manner in which keys are requested, perform a risk-based authentication to continually monitor that the user is behaving like a normal user, and measure the execution environment to detect malicious modifications thereto it.

As also detailed herein, in connection with FLE approaches, an aspect of the invention includes maintaining the trust hierarchy entirely within the secure processing boundary of the secure module 190. As such, the trust hierarchy is not available to malicious processes running on a compromised host. As this refers to transferring which entities can access given items (that is, authorization) entirely into the secure module 190, and taking control substantially away from the OS entirely. Additionally, in connection with FLE approaches, identity management can be moved into the secure module 190 and also supplemented in the secure module 190. As used herein, identify management (IDM) refers to identifying the identity of the resource which is requesting access to the keys protecting a specific piece of data. Such supplementation can include, for example, adding biometric authentication to an identity. As such, compromising the OS identity management does not necessarily result in data disclosure. By way merely of illustration consider rootkits, which break the OS and allow the OS to function in a manner which is deceptive to the user. For example, rootkits may allow access to a file to a specific user, despite the fact that the user should not have access to that file. Accordingly, if the IDM functionality is running in the secure processor, on trusted code, running off a root of trust, then rootkits will not function. The OS might allow the above-noted user to access the file, but the IDM would have to validate that access (and the key would not be handed over because the secure device's IDM is not compromised).

Additionally, in at least one embodiment of the invention, all cryptographic operations are performed within the secure module 190. One or more embodiments of the invention can also include implementation of key escrow and/or key mirroring techniques to enhance reliability of key storage. Key escrow refers to storing copies of the key in a different location for compliance and/or business continuance reasons. Key mirroring refers to storing a copy of the key in a different location in case of hardware failure. Further, requirements such as key rotation can also be facilitated using the techniques detailed herein.

At least one embodiment of the invention can include extending existing utilized cryptographic modes to support disk encryption. An example extension can include computation of crypto-variables supporting the existing utilized cryptographic modes within the boundary of the secure module 190. As used herein, a crypto-variable refers to any cryptographic variable including but not limited to a key, an initialization vector (IV), and a temporary variable and state used in a cryptographic computation.

Figure 2:
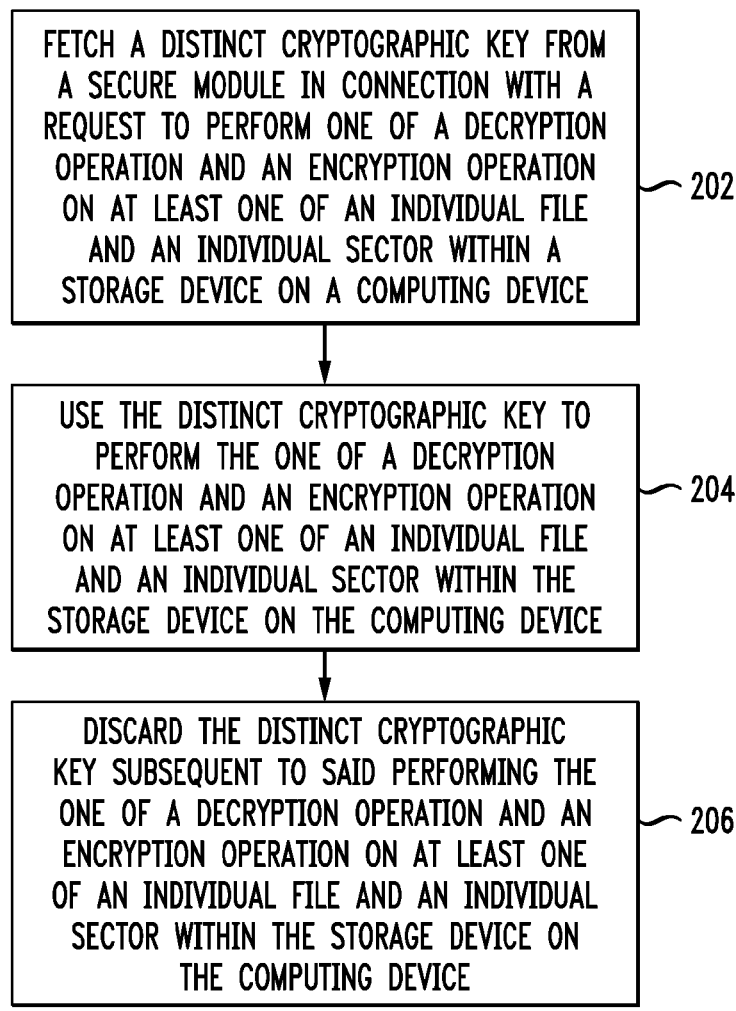
FIG. 2 is a flow diagram illustrating techniques according to an embodiment of the invention.

FIG. 2 is a flow diagram illustrating techniques according to an embodiment of the present invention. Step 202 includes fetching a distinct cryptographic key from a secure module in connection with a request to perform one of a decryption operation and an encryption operation on at least one of an individual file and an individual sector within a storage device on a computing device. As detailed herein, the secure module includes a tamper-respondent processor with a defined cryptographic boundary (while the computing device need not include such features in one or more embodiments of the invention). Fetching the distinct cryptographic key from a secure module can include fetching the distinct cryptographic key as generated by the secure module.

Step 204 includes using the distinct cryptographic key to perform the one of a decryption operation and an encryption operation on the at least one of an individual file and an individual sector within the storage device on the computing device. In at least one embodiment of the invention, using the distinct cryptographic key to decrypt the individual encrypted file within the storage device on the computing device can include using the distinct cryptographic key within a pre-determined amount of time subsequent to said fetching of the distinct cryptographic key from a secure module.

Step 206 includes discarding the distinct cryptographic key subsequent to said performing the one of a decryption operation and an encryption operation on at least one of an individual file and an individual sector within the storage device on the computing device. Discarding the distinct cryptographic key can include over-writing the distinct cryptographic key. Additionally, discarding the distinct cryptographic key can include discarding the distinct cryptographic key within a pre-determined amount of time.

The techniques depicted in FIG. 2 can additionally include transferring one or more identity, authentication and/or authorization management systems to the secure module. Further, at least one embodiment of the invention includes techniques for requesting a new key to write an encrypted sector/file. Also, the techniques depicted in FIG. 2 can include employing one or more actions from via the secure module to defend against an attempting attack the distinct cryptographic key. As described herein, such actions can include running a binary integrity check against memory space on the computing device, running analytics on one or more access patterns of one or more files (and/or one or more sections of multiple files) of the storage device to detect one or more anomalies, etc. Such actions, in accordance with one or more embodiments of the invention, can also include hosting one or more parts of operating system code inside the secure device, and frustrating modifications (for example, code wedging of application programming interfaces (APIs)) by rearranging layout and structure of the operating system code on each access while maintaining code function.

As further detailed herein, at least one embodiment of the invention can also include fetching a distinct cryptographic key from a secure module in connection with a request to decrypt at least one encrypted section of multiple files within a storage device on a computing device. Further, such an embodiment can include using the distinct cryptographic key to decrypt the at least one encrypted section of multiple files within the storage device on the computing device, and discarding the distinct cryptographic key subsequent to said decryption of the at least one encrypted section of multiple files within the storage device on the computing device.

Figure 3:
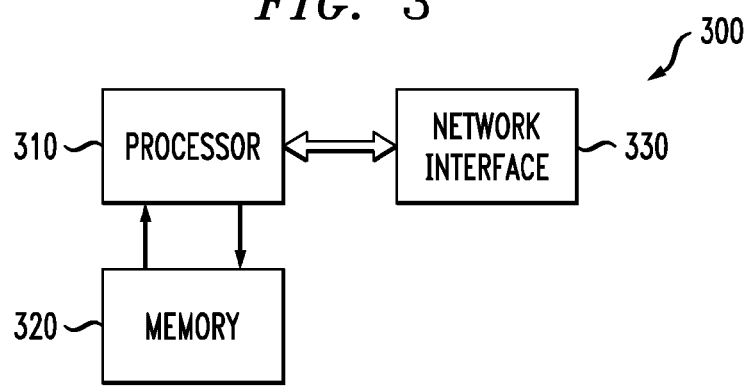
FIG. 3 illustrates one possible example implementation of a given secure module or computing device, according to an embodiment of the invention.

FIG. 3 illustrates one possible example implementation of a given secure module or computing device, according to an embodiment of the invention. Specifically, in reference to the example embodiment depicted in FIG. 1, the processing device 300 as shown in FIG. 3 may be viewed as representing, by way merely of example, an instance of secure module 190 and/or computing device 200. The processing device 300 in this implementation includes a processor 310 coupled to a memory 320 and a network interface 330. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of a cryptographic technique in accordance with an embodiment of the invention can be implemented at least in part in the form of one or more software programs that are stored in memory 320 and executed by the corresponding processor 310. The memory 320 is also used for storing information used to perform computations or other operations associated with the techniques detailed herein.

The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices and/or modules that can benefit from key management techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
fetching a distinct cryptographic key from a secure module in connection with a request to perform one of a decryption operation and an encryption operation on at least one of an individual file and an individual sector within a storage device on a computing device;
using the distinct cryptographic key to perform the one of a decryption operation and an encryption operation on the at least one of an individual file and an individual sector within the storage device on the computing device; and
discarding the distinct cryptographic key within a pre-determined amount of time (i) subsequent to said performing the one of a decryption operation and an encryption operation on at least one of an individual file and an individual sector within the storage device on the computing device and (ii) prior to use for an additional one of a decryption operation and an encryption operation.

2. The method of claim 1, wherein the secure module comprises a tamper-respondent processor with a defined cryptographic boundary.

3. The method of claim 1, further comprising:
transferring one or more identity management systems to the secure module.

4. The method of claim 1, further comprising:
transferring one or more authentication management systems to the secure module.

5. The method of claim 1, further comprising:
transferring one or more authorization management systems to the secure module.

6. The method of claim 1, wherein said fetching a distinct cryptographic key from a secure module comprises fetching the distinct cryptographic key as generated by the secure module.

7. The method of claim 1, wherein said discarding the distinct cryptographic key comprises over-writing the distinct cryptographic key.

8. The method of claim 1, further comprising:
employing one or more actions from via the secure module to defend against an attempting attack the distinct cryptographic key.

9. The method of claim 8, wherein said one or more actions comprise running a binary integrity check against memory space on the computing device.

10. The method of claim 8, wherein said one or more actions comprise running analytics on one or more access patterns of one or more files of the storage device to detect one or more anomalies.

11. An article of manufacture comprising a non-transitory processor-readable storage medium having processor-readable instructions tangibly embodied thereon which, when implemented, cause a processor to carry out the steps of the method of claim 1.

12. An apparatus comprising:
a memory; and
at least one processor coupled to the memory; and
a plurality of modules executing on the at least one processor, wherein the plurality of modules comprise:
an interface module configured to fetch a distinct cryptographic key from a secure module in connection with a request to perform one of a decryption operation and an encryption operation on at least one of an individual file and an individual sector within a storage device on a computing device;
a processor module configured to use the distinct cryptographic key to perform the one of a decryption operation and an encryption operation on the at least one of an individual file and an individual sector within the storage device on the computing device; and
an over-writer module configured to discard the distinct cryptographic key within a pre-determined amount of time (i) subsequent to said performing the one of a decryption operation and an encryption operation on at least one of an individual file and an individual sector within the storage device on the computing device and (ii) prior to use for an additional one of a decryption operation and an encryption operation.

13. A method comprising:
fetching a distinct cryptographic key from a secure module in connection with a request to decrypt at least one encrypted section of multiple files within a storage device on a computing device;
using the distinct cryptographic key to decrypt the at least one encrypted section of multiple files within the storage device on the computing device; and
discarding the distinct cryptographic key within a pre-determined amount of time (i) subsequent to said decryption of the at least one encrypted section of multiple files within the storage device on the computing device and (ii) prior to use for an additional decryption operation.

14. The method of claim 13, wherein the secure module comprises a tamper-respondent processor with a defined cryptographic boundary.

15. The method of claim 13, wherein said using the distinct cryptographic key to decrypt the at least one encrypted section of multiple files within the storage device on the computing device comprises using the distinct cryptographic key within a pre-determined amount of time subsequent to said fetching of the distinct cryptographic key from a secure module.

16. The method of claim 13, wherein said discarding the distinct cryptographic key comprises over-writing the distinct cryptographic key.

17. The method of claim 13, further comprising:
employing one or more actions from via the secure module to defend against an attempting attack the distinct cryptographic key.

18. The method of claim 17, wherein said one or more actions comprises running a binary integrity check against memory space on the computing device.

19. The method of claim 17, wherein said one or more actions comprise hosting one or more parts of operating system code inside the secure device, and rearranging layout and structure of the operating system code on each access while maintaining code function.

20. The method of claim 17, wherein said one or more actions comprises running analytics on one or more access patterns of one or more sections of multiple files of the storage device to detect one or more anomalies.

* * * * *